United States Patent
Getz et al.

(10) Patent No.: US 10,635,189 B2
(45) Date of Patent: Apr. 28, 2020

(54) HEAD MOUNTED DISPLAY CURSER MANEUVERING

(71) Applicant: RideOn Ltd., Tel-Aviv (IL)

(72) Inventors: Alon Getz, Haifa (IL); Ori Dov Kotek, Tel-Aviv (IL)

(73) Assignee: RideOn Ltd., Haifa (IL)

( * ) Notice: Subject to any disclaimer, the term of this patent is extended or adjusted under 35 U.S.C. 154(b) by 411 days.

(21) Appl. No.: 15/202,666

(22) Filed: Jul. 6, 2016

(65) Prior Publication Data

US 2017/0010692 A1    Jan. 12, 2017

Related U.S. Application Data

(60) Provisional application No. 62/188,754, filed on Jul. 6, 2015.

(51) Int. Cl.

| | |
|---|---|
| *G06F 3/0346* | (2013.01) |
| *G06T 19/00* | (2011.01) |
| *G06F 3/01* | (2006.01) |
| *G06F 3/0481* | (2013.01) |
| *G06F 3/0482* | (2013.01) |
| *G06F 3/0484* | (2013.01) |
| *H04M 1/725* | (2006.01) |

(52) U.S. Cl.
CPC ............ *G06F 3/0346* (2013.01); *G06F 3/012* (2013.01); *G06F 3/0482* (2013.01); *G06F 3/04812* (2013.01); *G06F 3/04842* (2013.01); *G06T 19/006* (2013.01); *H04M 1/72527* (2013.01)

(58) Field of Classification Search
None
See application file for complete search history.

(56) References Cited

U.S. PATENT DOCUMENTS

| | | | |
|---|---|---|---|
| 2008/0070684 A1* | 3/2008 | Haigh-Hutchinson | ................. A63F 13/5375 463/32 |
| 2010/0142748 A1* | 6/2010 | Oldroyd | ............ G06K 9/00637 382/100 |
| 2010/0238161 A1 | 9/2010 | Varga et al. | |
| 2010/0287500 A1* | 11/2010 | Whitlow | ................ G02B 27/01 715/810 |
| 2012/0218395 A1* | 8/2012 | Andersen | ................ G06F 3/017 348/77 |

(Continued)

FOREIGN PATENT DOCUMENTS

WO    WO 2013/185714    12/2013

*Primary Examiner* — David D Davis

(57) ABSTRACT

An augmented reality system and method including calculating an orientation of a head mounted display, the head mounted display comprising a cursor located fixedly on the display, estimating pixel positions of a real world feature viewable via the head mounted display, and displaying a display element having an assigned function in a fixed position relative to the estimated pixel positions the real world feature, the display element is configured to execute the assigned function when the cursor is maneuvered to be on top of the display element. Additionally, the method including displaying, on a head mounted display a plurality of display elements, each having an assigned function, in a fixed positions relative to real world features viewed via the display, detecting according to sensed orientation when the cursor is maneuvered to be on top of one of the display elements, and executing the corresponding assigned function.

22 Claims, 6 Drawing Sheets

(56) References Cited

U.S. PATENT DOCUMENTS

| | | | |
|---|---|---|---|
| 2013/0044128 A1* | 2/2013 | Liu | G09G 5/00 |
| | | | 345/633 |
| 2013/0278631 A1 | 10/2013 | Border et al. | |
| 2013/0293530 A1 | 11/2013 | Perez et al. | |
| 2014/0002444 A1 | 1/2014 | Bennett et al. | |
| 2014/0055846 A1 | 2/2014 | Wheeler et al. | |
| 2014/0098134 A1 | 4/2014 | Fein et al. | |
| 2015/0153922 A1* | 6/2015 | Ballard | H04W 76/10 |
| | | | 345/156 |

* cited by examiner

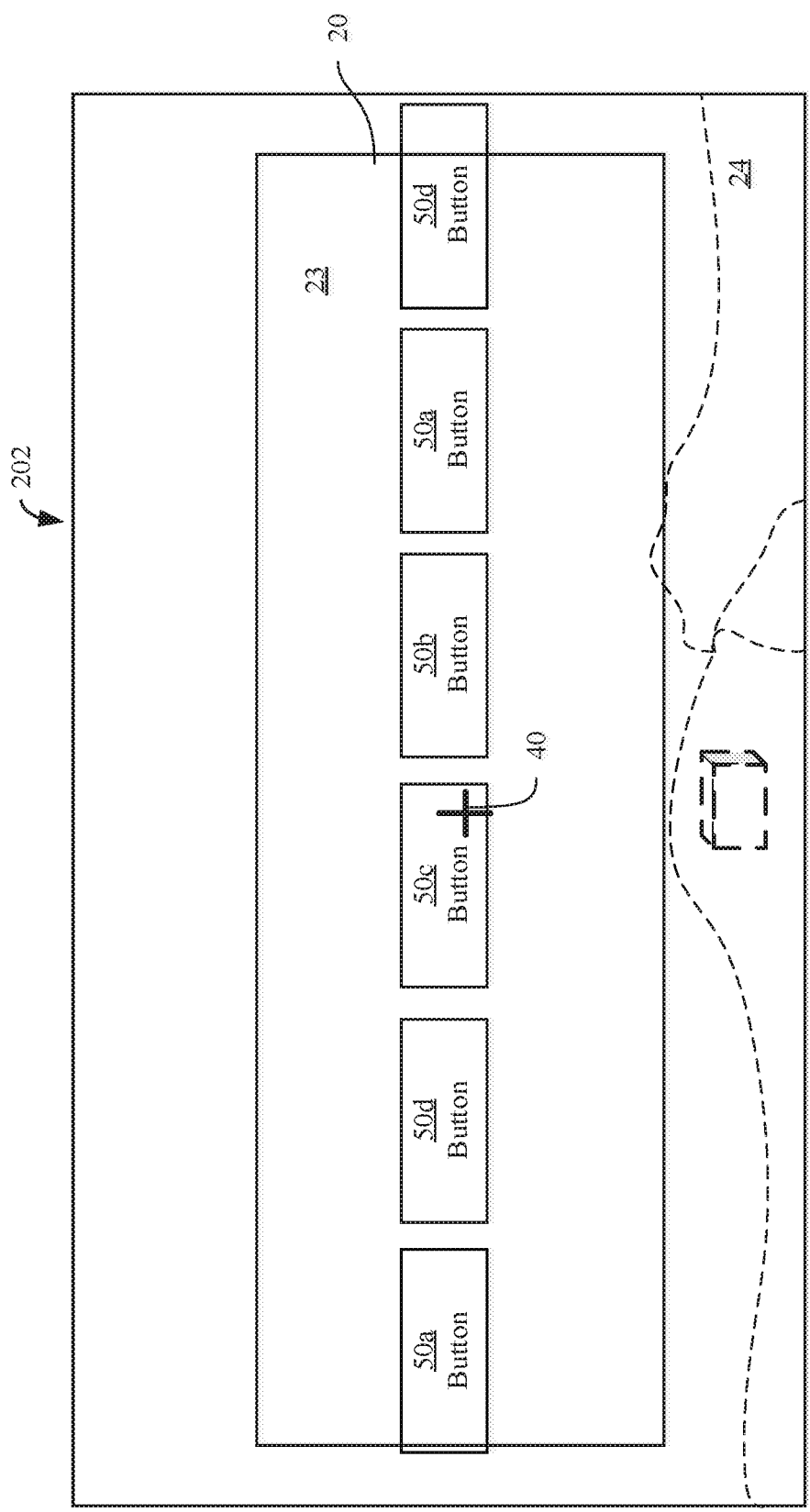

HEAD MOUNTED DISPLAY CURSER MANEUVERING

RELATED APPLICATION

This application claims the benefit of priority under 35 USC 119(e) of U.S. Provisional Patent Application No. 62/188,754, filed Jul. 6, 2015, the contents of which are incorporated herein by reference in their entirety.

FIELD AND BACKGROUND OF THE INVENTION

Augmented reality devices are increasingly in use for various uses and activities, from military or sports uses such as aviation and navigation, to gaming applications and museum visits. Usually, augmented reality devices are used to enhance the orientation ability and receive various kinds of information without needing to cease the activity and without needing to gaze down to guidance books.

Controlling a user interface in an augmented-reality-enabled hardware device usually requires free hands for controlling the device by touch pads, hand gestures or other known manual control methods. Some other devices use, for example, voice activation.

SUMMARY OF THE INVENTION

According to an aspect of some embodiments of the present invention there is provided a system including a head mounted display comprising a cursor located fixedly on the display, an orientation sensor configured to sense an orientation of the head mount display, and at least one hardware processor. The at least one hardware processor is configured to execute a code for:

calculating an orientation of the head mounted display, based on orientation sensor data received from the orientation sensor, according to the calculated orientation, estimating pixel positions of a real world feature viewable via the head mounted display, and displaying a display element having an assigned function in a fixed position relative to the estimated pixel positions the real world feature. The display element is configured to execute the assigned function when the cursor is maneuvered to be on top of the display element.

According to another aspect of some embodiments of the present invention there is provided a system. for displaying a cursor on a head mounted display. The system includes an orientation sensor configured to sense an orientation of the head mount display and at least one hardware processor configured to execute a code for:

displaying on the head mounted display a plurality of display elements, each having an assigned function, in a fixed positions relative to real world features viewed via the display, detecting according to the sensed orientation when the cursor is maneuvered to be on top of one of the display elements, and once detecting, executing the corresponding assigned function.

In some embodiments of the present invention, the system comprises a positioning interface that receives data about a location of the system. In such embodiments the processor executes a code for estimating pixel positions of a real world feature viewable via the head mounted display according to the calculated orientation and the location data.

In some embodiments of the present invention, the system comprises a storage device configured to store at least one of a terrain map and data about points of interest in the map.

In some embodiments of the present invention, the processor is configured to execute a code for estimating pixel positions of a real world point of interest viewable via the head mounted display, by combining a system location and the calculated display orientation and according to stored data about points of interest, and displaying a display element in a fixed position relative to the estimated pixel positions.

In some embodiments of the present invention, the system comprises a camera to generate image data for calculation of the orientation of the display.

In some embodiments of the present invention, the display is mountable on a user's head so that the display covers at least a portion of the field of view of the user.

In some embodiments of the present invention, a line-of-sight direction of the display coincides with the line of sight of a user when the display is mounted on the user's head.

In some embodiments of the present invention, the display comprises a displayed element and the processor is configured to execute a code for activating the displayed element when the cursor is located on the displayed element for a predetermined period of time.

In some embodiments of the present invention, the display comprises a displayed element and the processor is configured to execute a code for calculating an angle between the calculated orientation direction of the display and the displayed element, and activating the displayed element when the angle is smaller than a predetermined threshold for a minimal predetermined period of time.

In some embodiments of the present invention, the display element is an activation button and when activated, the processor is configured to execute a code for performing one of enabling or disabling of system features, communicating with external devices and controlling a phone device.

In some embodiments of the present invention, the display element is an information tag and when activated, the processor is configured to execute a code for displaying information about a certain viewed point of interest.

In some embodiments of the present invention, the processor is configured to execute a code for locating a display element in a certain height above the horizon.

In some embodiments of the present invention, the processor is configured to execute a code for locating a display element in a certain height above a viewed terrain.

In some embodiments of the present invention, the processor is configured to execute a code for identifying in a height grid of a terrain a highest point and locating the display element in a certain height above the highest point.

According to another aspect of some embodiments of the present invention there is provided a method including calculating by the processor an orientation of a head mounted display, based on orientation sensor data received from an orientation sensor, the head mounted display comprising a cursor located fixedly on the display, according to the calculated orientation, estimating by the processor pixel positions of a real world feature viewable via the head mounted display, and displaying by the processor a display element having an assigned function in a fixed position relative to the estimated pixel positions the real world feature, the display element is configured to execute the assigned function when the cursor is maneuvered to be on top of the display element.

According to another aspect of some embodiments of the present invention there is provided a method including displaying, by a processor, on a head mounted display a plurality of display elements, each having an assigned function, in a fixed positions relative to real world features viewed via the display, the display comprising a cursor located fixedly on the display, detecting by the processor according to sensed orientation when the cursor is maneuvered to be on top of one of the display elements, and once detecting, executing by the processor the corresponding assigned function.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 is a schematic illustration of a display and further another exemplary field of view according to some embodiments of the present invention.

DETAILED DESCRIPTION

Figure 1:
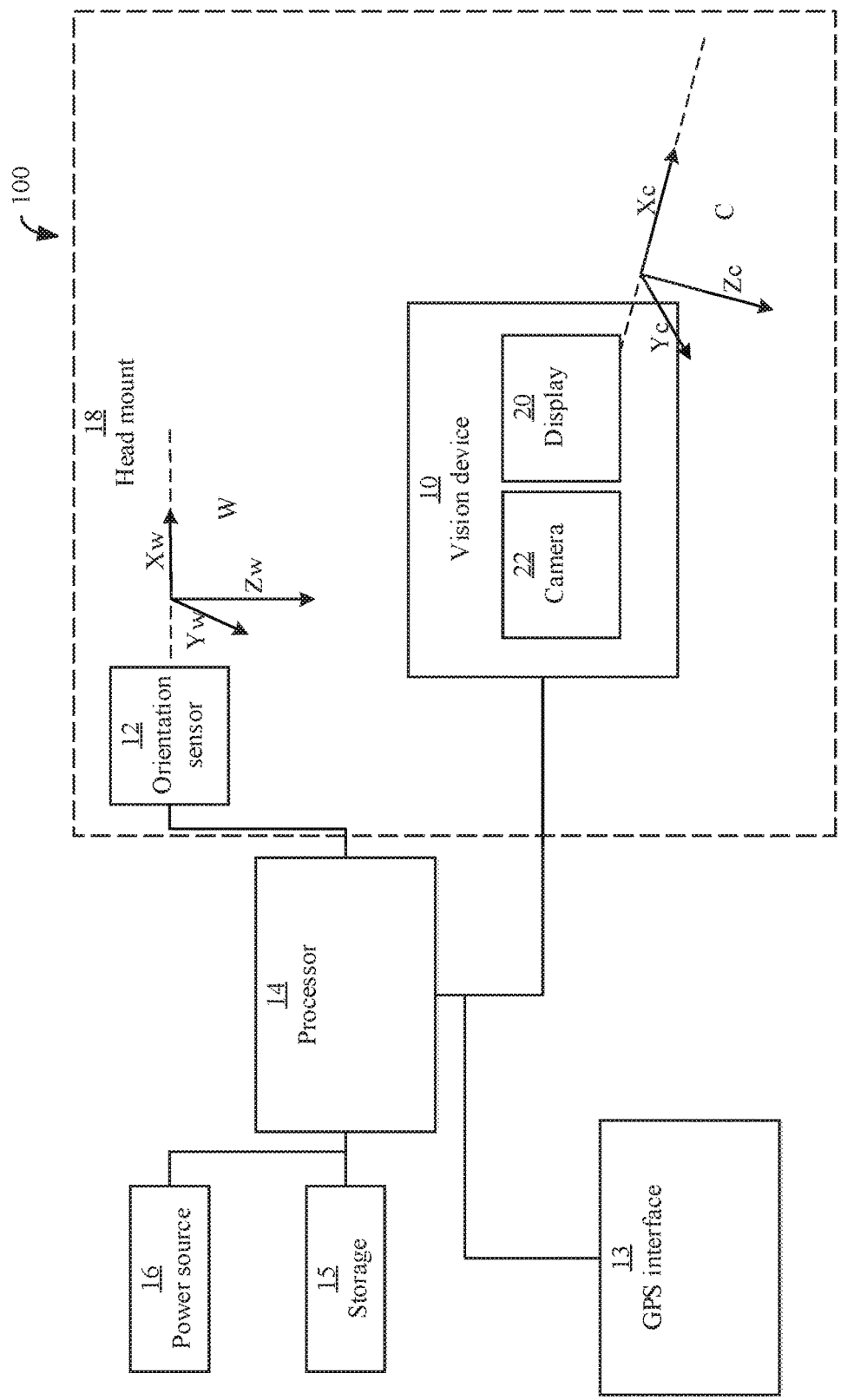
FIG. 1 is a schematic illustration of a system according to some embodiments of the present invention.

Some embodiments of the present invention provides an augmented reality system and method that enable user interface controlling without requiring free hands. The augmented reality system according to embodiments of the present invention is especially suitable for outdoor activity, when the user's hands are usually busy and the conditions may not be suitable for voice activation.

An objective of some embodiments of the present invention is to provide solution for controlling an augmented reality system without involving the user's hands and without additional user interface hardware. The provided solution may enable keeping the user's eyes on his surroundings rather than on control devices, thus increasing usability and safety.

Accordingly, in some embodiments of the present invention, a user may see various activation buttons displayed on top of the real world view, by using a see-through display. The buttons may appear in fixed locations relative to real world elements or relative to certain terrain attributes, such as the horizon or a highest point in the user's field of view. An activation button may be activated, for example, by tilting the user's head so that a line of sight of the user intersects with an activation button for a pre-determined period of time.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of a system 100 for supporting hand free graphical user interface navigation in a graphical user interface presented in a head mounted augmented reality display, according to some embodiments of the present invention. System 100 may include a vision device 10, an inertial orientation sensor unit 12, a positioning interface 13, a processor 14, a storage device 15, a power source 16 and a head mount 18. Head mount 18 may carry vision device 10, sensor unit 12, processor 14 and/or power source 16. Head mount 18 may include a helmet, head strap, or any other suitable head mount.

Vision device 10 may include a head mount display 20 and, optionally, a camera 22. Camera 22 may generate image data, which may facilitate calculation by processor 14 of a Line of Sight (LOS) direction Xc of display 20 and/or head orientation of a user wearing head mount 18. Head mount 18 may be configured to be mounted on a user's head so that display 20 covers at least a portion of the field of view of the user. In some embodiments of the present invention LOS direction Xc of display 20 coincides, at least approximately, with the line of sight of the user.

As discussed in more detail herein, based on LOS direction Xc processor 14 may determine which real world elements are viewed via display 20, and/or where on the display they are viewed, according to locations of real world elements in a frame of reference C of display 20, formed by LOS direction Xc, direction Yc pointing to the right of the display and direction Zc pointing to the bottom of the display. Based on the locations of the real world elements, processor 14 may determine which display elements are to be displayed and where on the display they should be displayed. At least a portion of display 20 may be transparent, so as to enable a user to see through display 20 concurrently with seeing displayed elements. As described in more detail herein below, display 20 may display elements such as, for example, information tags and/or activation buttons, on certain locations upon display 20. In some embodiments, the display elements may be semi-transparent.

Inertial orientation sensor unit 12 may include, for example, Micro-Electro-Mechanical System (MEMS) gyroscopes, such as in an Attitude Heading Reference System (AHRS) or Inertial Measurements Unit (IMU). Inertial orientation sensor unit 12 may generate orientation sensor data, which may enable calculation of head and/or display orientation, for example, by processor 14. Orientation sensor unit 20 may sense orientation data of display 20. Based on the orientation data, processor 14 may calculate direction of a Line of Sight (LOS) of display 20 in an inertial frame of reference W, wherein direction Xw points towards the true north direction, direction Yw points east and direction Zw points towards the center of Earth.

positioning interface 13 may receive data about a location of system 100, for example from a GPS device that generates location data about a location of system 100. Processor 14 may identify, based on the location data, where system 100 is located, for example on a map stored in storage device 15. Processor 14 may use the location data for identifying points of interest and/or real world features such as a terrain height variations.

In some embodiments of the present invention, processor 14 may calculate based on the location data a velocity direction of system 100, and use this information to enhance accuracy of orientation sensor data from sensor unit 12. Storage device 15 may store terrain information such as, for example, maps, height grids, and information overlays such as, for example, information about Points of Interest (POI), sites, terrain features and/or any other suitable terrain information. The POIs may be real-world elements located in frame of reference W.

Figure 2:
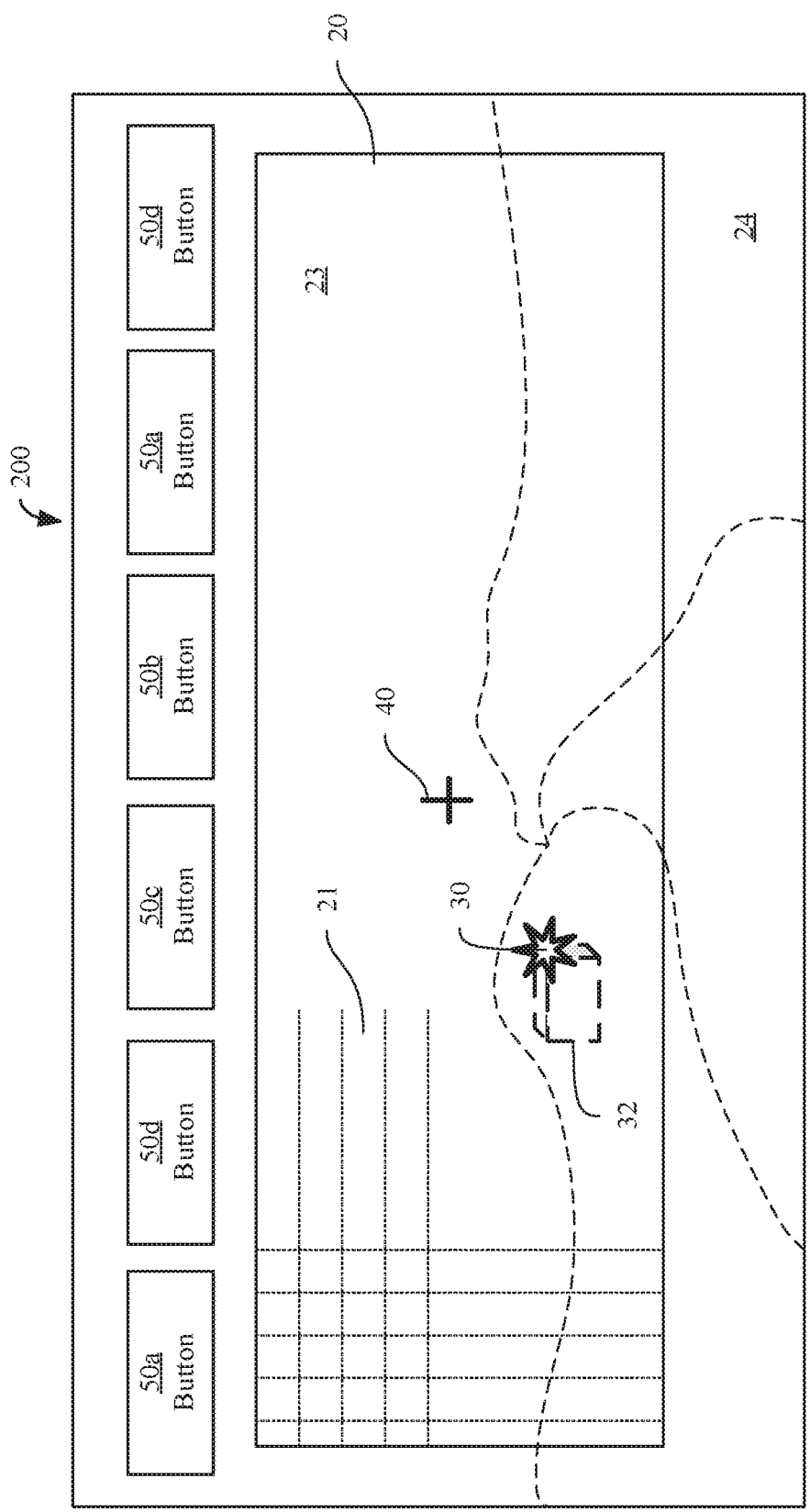
FIG. 2 is a schematic illustration of a display showing an exemplary field of view according to some embodiments of the present invention.

During operation of system 100, a real world element may be viewed via display 20. Display 20 may include and/or display a cursor to facilitate selection and/or activation of display elements by a user. Reference is now made to FIG. 2, which is a schematic illustration of a display 20 and an exemplary field of view 200 according to some embodiments of the present invention. Field of view 200 may include, for example, a field viewable by rotation of the head of a user wearing head-mount 18 in various directions. At a certain time, field of view 200 includes a viewable portion 23, viewable through transparent display 20, and a hidden portion 24 covering the rest of field of view 200. Processor 14 may configure activation buttons 50*a*-50*d* upon field of view 200. For each button 50*a*-50*d*, at least one instance of that button may appear, in different directions.

Display 20 may be virtually divided to pixel elements by a virtual pixel mesh 21 overlaid on display 20 by processor 14, for example in order to define positions of viewed elements. It will be appreciated that mesh 21 may be overlaid by processor on the entire display 20 or on larger portions of display 20 than shown in FIG. 2, and it is drawn only on a portion of display 20 for clarity. As mentioned, display 20 may include a cursor 40, located fixedly at the center of display 20, i.e. the intersection point of the line of sight of display 20 with display 20.

Figure 3:
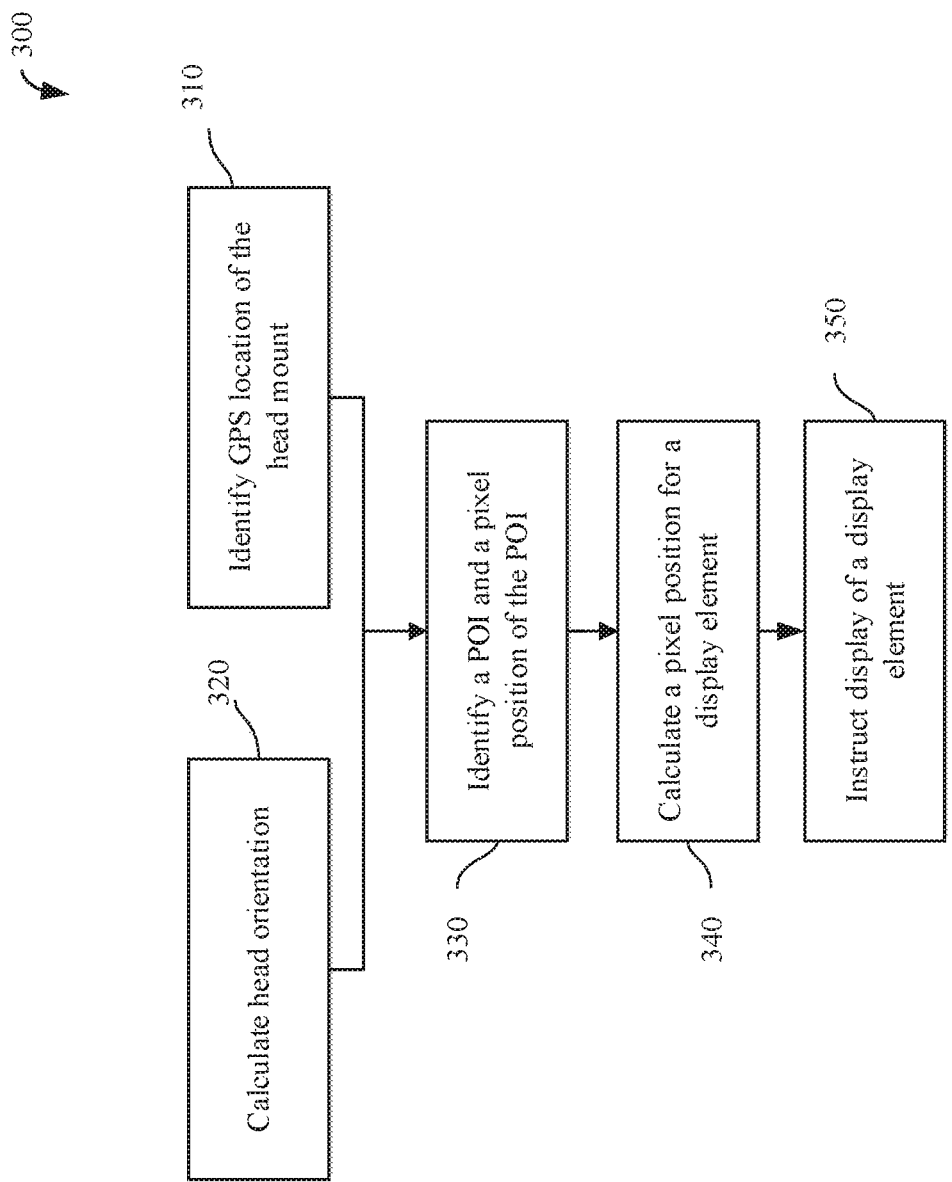
FIG. 3 is a schematic flowchart illustrating of a method for determining pixel position of a displayed element on a display, according to some embodiments of the present invention.

The display of the display elements may be controlled by processor 14. Processor 14 may instruct display of a display element, for example, in accordance to real world elements and/or directions viewable through display 20. Further, as described in more detail herein below, a display element may appear fixed at certain directions or on certain real world elements and/or locations. Reference is now made to FIG. 3, which is a schematic flowchart illustrating a method 300 for determining pixel position of a displayed element on display 20, according to some embodiments of the present invention.

As indicated in block 310, processor 14 may identify the location of system 100 according to information received from GPS device 13. As indicated in block 320, based on orientation sensor data received from sensor unit 12, processor 14 may calculate estimation of an LOS direction Xc of display 20. By combining the location of system 100, the orientation of display 20 and terrain data from storage device 15, processor 14 may deduce which POIs are viewed via display 20 and at which pixel position a POI is viewed on the plane of display 20, as indicated in block 330. Then, as indicated in block 340, processor 14 may calculate pixel positions for a display element to be displayed upon, and instruct displaying of the display element on display 20 accordingly. As indicated in block 350, processor 14 may instruct displaying of a display element fixed to a corresponding POI's location on display 20, according to the calculated pixel positions. For example, as shown in FIG. 2, during operation of system 100, a POI 32 may be viewed via display 20. Display 20 may include an information tag 30 fixed on a certain viewed element, such as POI 32. The process of identifying a system location, a display orientation and POIs, calculating pixel positions for display elements, and instructing the display in the calculated pixel locations, may be performed by processor 14 periodically and/or upon a pre-determined event.

Accordingly, upon a head movement of a user wearing head mount 18, a real world element is viewed via different portions of display 20, and a respective display element may move accordingly upon the different portions of display 20, staying fixed on the real world element. Some display elements are configured by processor 14 to appear in certain fixed directions relative to frame of reference W, independently from the orientation of head-mount 18 sensed by sensor unit 14.

In some embodiments of the present invention, at least some of the display elements may be activated, for example by a user wearing head mount 18, by turning the estimated line of sight of display 20 to the relevant display element. Processor 14 may calculate angles between the line of sight and the display elements, for example periodically and/or upon a pre-determined event. When an angle between the estimated line of sight and a display element is below a pre-determined threshold, for example, for a minimal pre-determined period of time, the display element may be activated. For example, an activation button may perform its assigned function, or an information tag may display information about a certain viewed point of interest (POI) such as, for example, a restaurant, a lodging place, a tourist site and/or a viewpoint. In some embodiments, the information tag may include an icon indicative of the type of the POI. Functions assigned to activation buttons may include, for example, enabling or disabling system features, communicating with external devices, controlling a phone device, and/or any other suitable functions.

Activation buttons 50*a*-50*d* may be located by processor 10 in a certain height above the horizon. In some embodiments of the present invention, buttons 50*a*-50*d* may be fixed at a certain height above the horizon, so that when display 20 is tilted up and/or to the sides, cursor 40 may be located on a button. In some embodiments, processor 10 may locate buttons 50*a*-50*d* in a certain pre-determined height above the viewed terrain. Processor 10 may identify, for example, the border line between the sky and the terrain viewable via display 20, and locate buttons 50*a*-50*d* in the predetermined height.

Figure 4:
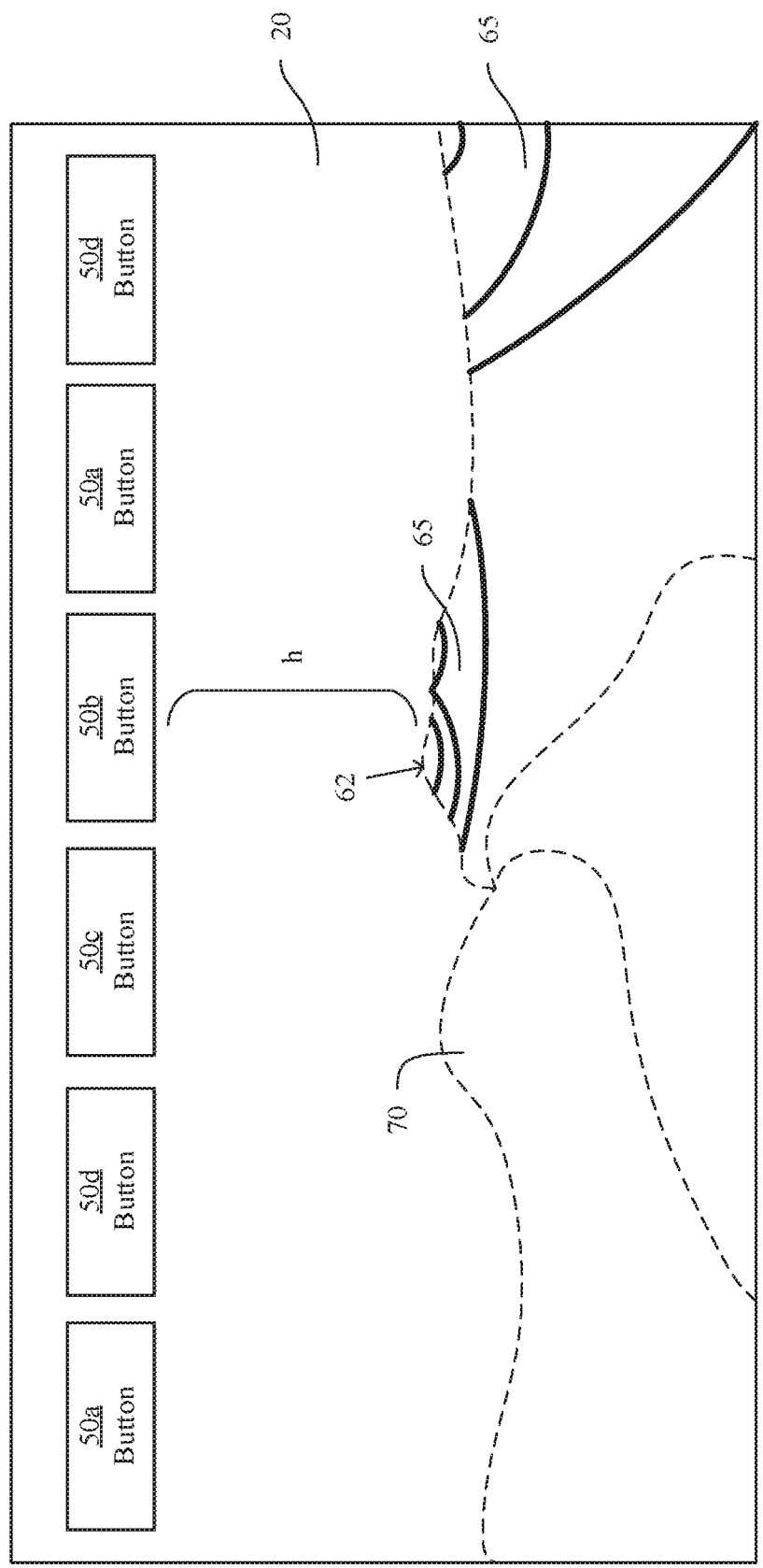
FIG. 4 is a schematic illustration of a terrain viewed via a display covered by a height grid for determination of locations of activation buttons according to some embodiments of the present invention.

In some embodiments of the present invention, processor 14 may use a height grid of a terrain, for example stored in storage device 15, in order to determine a location of buttons 50*a*-50*d*. Reference is now made to FIG. 4, which is a schematic illustration of a terrain 70 viewed via display 20 covered by a height grid 65 for determination of the height of buttons 50*a*-50*d*. For example, processor 14 may look in height grid 65 of the terrain for a highest point 62 in the terrain viewable via display 20, and locate buttons 50*a*-50*d* in a pre-determined height h above the highest point.

Figure 5:
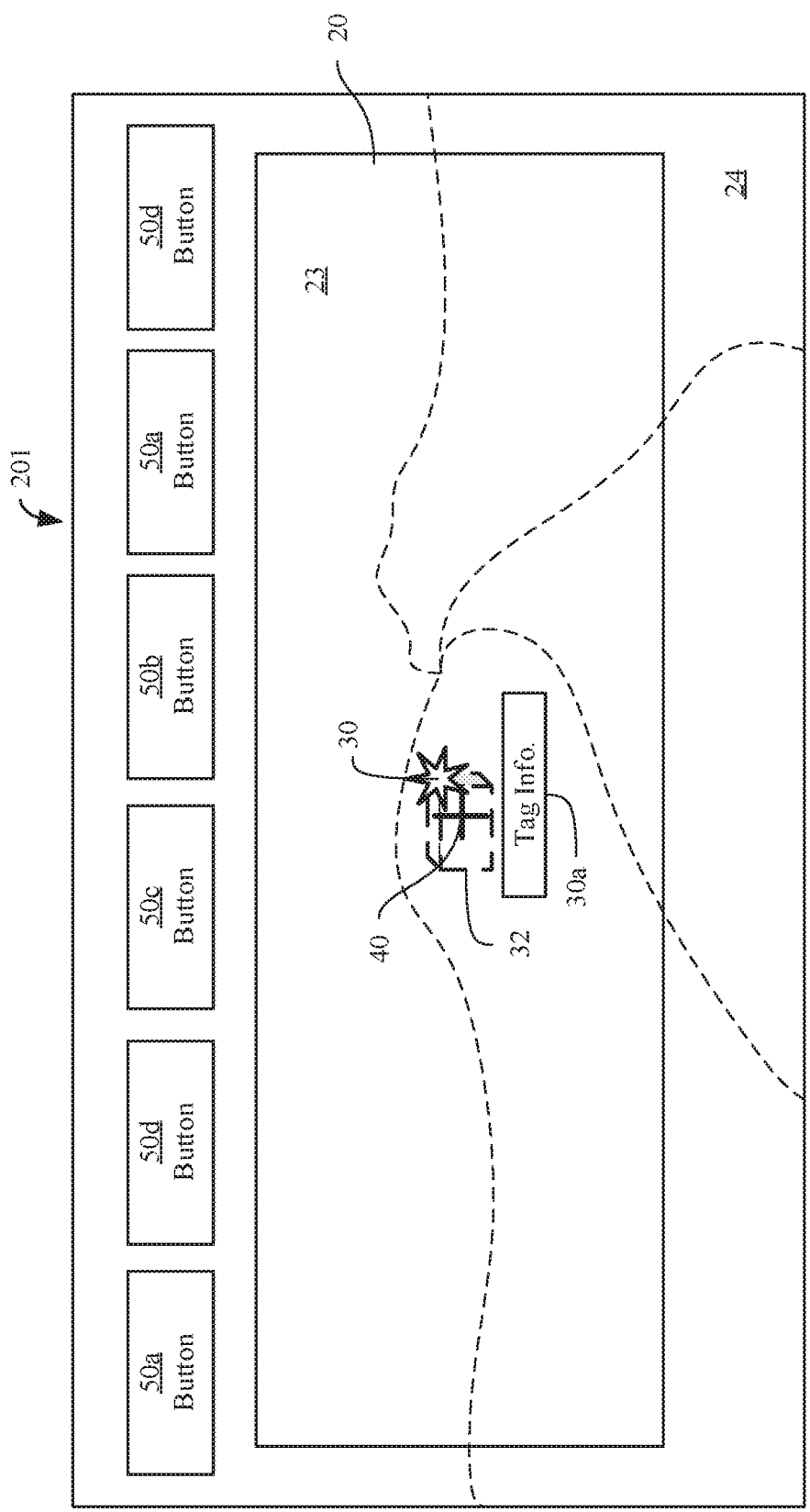
FIG. 5 is a schematic illustration of a display and another exemplary field of view according to some embodiments of the present invention.

Reference is now made to FIG. 5, which is a schematic illustration of a display 20 and an exemplary field of view 201 according to some embodiments of the present invention. For example, when display 20 is tilted so that cursor 40 is located over information tag 30 and/or POI 32, information tag 30 may be activated to display tag information 30a about POI 32. For example, in case POI 32 is a restaurant, tag information 30a may include opening hours and other information about the restaurant such as, for example, the type of food being served, happy hour times, and/or any other suitable data.

Reference is now made to FIG. 6, which is a schematic illustration of a display 20 and an exemplary field of view 202 according to some embodiments of the present invention. For example, when display 20 is tilted so that cursor 40 is located over one of buttons 50a-50d, the respective button may be activated. In some embodiments, processor 14 may include a timer to activate a button once cursor 40 is located over the button a pre-determined amount of time, such as, for example, a few tenths of seconds.

Activation of one of buttons 50a-50d may activate a function assigned to the activated button. Some of the buttons may enable or disable system features such as, for example, indication upon display 20 of a certain kind of POIs 30 viewable via display 20. For example, activation of a dedicated button may activate/deactivate display of indications/information tags about a certain kind of POIs such as, for example, restaurants, friends, trails, gondola lifts, and/or any other kind of POIs, viewable via display 20. For example, activation of a dedicated button may initiate/cease communication with an external device. For example, activation of a dedicated button may perform a certain action with a phone device. Additionally or alternatively, any other suitable function may be assigned to activation buttons 50a-50d.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system comprising:
    a head mounted display configured to allow a user to see through the display and comprising a cursor displayed in a fixed position on the display;
    an orientation sensor configured to sense an orientation of the head mount display; and
    at least one hardware processor configured to execute a code for:

calculating an orientation of the head mounted display, based on orientation sensor data received from the orientation sensor;

according to the calculated orientation, estimating pixel positions on said display, of a real world feature viewed by said user through the head mounted display;

displaying a display element on said display, in a fixed position, relative to the estimated pixel positions of the real world feature, said display element is associated with an assigned function; and executing the assigned function when the cursor is maneuvered to be viewed by said user as positioned on top of the display element;

wherein the cursor is maneuvered by causing a movement of said display element on said display by moving said head mounted display by said user.

2. The system of claim 1, comprising a positioning interface configured to receive data about a location of the system, and wherein the processor is configured to execute a code for estimating pixel positions of said real world feature viewed by said user through the head mounted display according to the calculated orientation and the location data.

3. The system of claim 1, comprising a storage device configured to store at least one of a terrain map and data about points of interest in the map.

4. The system of claim 1, wherein said processor is configured to execute a code for:

estimating pixel positions of a real world point of interest viewed by said user through the head mounted display, by combining a system location and the calculated display orientation and according to stored data about points of interest; and displaying a display element in a fixed position relative to the estimated pixel positions.

5. The system of claim 1, wherein the system comprises a camera to generate image data for calculation of the orientation of the display.

6. The system of claim 1, wherein the display is mountable on a user's head so that the display covers at least a portion of the field of view of the user.

7. The system of claim 6, wherein a line-of-sight direction of the display coincides with the line of sight of a user when the display is mounted on the user's head.

8. The system of claim 1, wherein the display comprises a displayed element and the processor is configured to execute a code for activating a function associated with the displayed element when the cursor is located on the displayed element for a predetermined period of time.

9. The system of claim 1, wherein the display comprises a displayed element and the processor is configured to execute a code for calculating an angle between the calculated orientation direction of the display and the displayed element, and activating a function associated with the displayed element when the angle is smaller than a predetermined threshold for a minimal predetermined period of time.

10. The system of claim 9, wherein the display element is an activation button and when activated, the processor is configured to execute a code for performing one of enabling or disabling of system features, communicating with external devices and controlling a phone device.

11. The system of claim 9, wherein the display element is an information tag and when activated, the processor is configured to execute a code for displaying information about a certain viewed point of interest.

12. The system of claim 11, wherein said information tag includes an icon.

13. The system of claim 1, wherein the processor is configured to execute a code for placing a display element on the display, in a certain height above the horizon.

14. The system of claim 1, wherein the processor is configured to execute a code for placing a display element on the display, in a certain height above a terrain viewed through the display.

15. The system of claim 14, wherein the processor is configured to execute a code for identifying in a height grid of a terrain a highest point and placing the display element in a certain height above the highest point.

16. The system of claim 1, wherein said at least one processor is further configured to execute a code for displaying, as an overlay, a virtual pixel mesh virtually dividing said head mounted display to a plurality of pixel elements, said virtual pixel mesh is drawn on only a portion of said head mounted display.

17. The system of claim 1, wherein said head mounted display is transparent and configured to allow said user to see through a portion of said display.

18. The system of claim 1, wherein said head mounted display is semi-transparent.

19. A system comprising:

a head mounted display configured to allow a user to see through the display and comprising a cursor displayed in a fixed position on the display;

an orientation sensor configured to sense an orientation of the head mount display; and at least one hardware processor configured to execute a code for:

displaying on the head mounted display a plurality of display elements, each of said plurality of display elements is displayed on said display in a fixed position relative to real world features viewed by said user through the display, each of said plurality of display elements is associated with an assigned function;

detecting according to the sensed orientation when the cursor is maneuvered to be on top of one of the display elements; and once detecting, executing the corresponding assigned function of said one of the display elements;

wherein the cursor is maneuvered by causing a movement of said plurality of display elements on said display by moving said head mounted display by said user.

20. The system of claim 19, wherein at least one of said plurality of display elements is displayed using a plurality of displayed instances of respective said at least one of said plurality of display elements.

21. A method comprising:

calculating by the processor an orientation of a head mounted display, based on orientation sensor data received from an orientation sensor, the head mounted display configured to allow a user to see through the display and comprising a cursor displayed in a fixed position on the display;

according to the calculated orientation, estimating by the processor pixel positions, on said display, of a real world feature viewed by said user through the head mounted display;

displaying by the processor on said display, a display element displayed in a fixed position relative to the estimated pixel positions of the real world feature, said display element is associated with an assigned function; and executing the assigned function when the cursor is maneuvered to be viewed by said user as positioned on top of the display element;

wherein the cursor is maneuvered by causing a movement of said display element on said display by moving said head mounted display by said user.

22. A method comprising:

displaying, by a processor, on a head mounted display a plurality of display elements, each having an assigned function, in a fixed positions relative to real world features viewed by a user through the display, the display configured to allow said user to see through the display and comprising a cursor located in a fixed position on the display;

detecting by the processor according to sensed orientation when the cursor is maneuvered to be viewed by said user as positioned on top of one of the display elements; and once detecting, executing by the processor the corresponding assigned function of said one of the display elements;

wherein the cursor is maneuvered by causing a movement of said plurality of display elements on said display by moving said head mounted display by said user.

* * * * *